United States Patent [19]
Ohtsuka et al.
[11] Patent Number: 4,895,678
[45] Date of Patent: Jan. 23, 1990

[54] METHOD FOR THERMAL DECOMPOSITION TREATMENT OF RADIOACTIVE WASTE

[75] Inventors: Katsuyuki Ohtsuka, Mito; Jin Ohuchi, Ibaraki; Hideaki Tamai, Saitama, all of Japan

[73] Assignee: Doryokuro Kakunenryo Kaihatsu Jigyodan, Tokyo, Japan

[21] Appl. No.: 363,305

[22] Filed: Jun. 8, 1989

Related U.S. Application Data

[63] Continuation of Ser. No. 233,280, Aug. 17, 1988, abandoned.

[30] Foreign Application Priority Data

Sep. 16, 1987 [JP] Japan ............................... 62-231857

[51] Int. Cl.[4] ........................... C21F 9/08; C21F 9/14; C03B 5/027; C03B 3/00

[52] U.S. Cl. .................................... 252/632; 110/237; 110/259; 110/342; 110/345; 159/47.3; 159/DIG. 12; 204/1.5; 219/121.16; 219/121.17; 252/626; 373/29; 373/33; 373/34; 373/35; 373/36

[58] Field of Search ....................... 252/626, 628, 632; 110/237, 238, 342, 345; 159/47.3, DIG. 12; 241/DIG. 38; 204/1.5, 157.21, 157.4; 373/29, 22, 30, 33, 35, 36

[56] References Cited

U.S. PATENT DOCUMENTS

| | | | |
|---|---|---|---|
| 3,586,613 | 6/1971 | Stewart | 204/1.5 |
| 4,046,544 | 9/1977 | Wills | 373/29 |
| 4,326,842 | 4/1982 | Adachi et al. | 252/626 |
| 4,341,915 | 7/1982 | Adachi et al. | 252/632 |
| 4,432,942 | 2/1984 | Adachi et al. | 252/626 |
| 4,514,329 | 4/1985 | Wakabayashi et al. | 252/632 |
| 4,581,163 | 4/1986 | Meininger et al. | 252/633 |
| 4,591,454 | 5/1986 | Ohtsuka et al. | 252/626 |
| 4,624,003 | 11/1986 | Eirich et al. | 373/29 |
| 4,627,069 | 12/1986 | Harvey et al. | 373/29 |
| 4,655,968 | 4/1987 | Queiser et al. | 252/632 |
| 4,701,246 | 10/1987 | Fujita et al. | 252/626 |
| 4,782,497 | 11/1988 | Sasaki et al. | 373/29 |
| 4,839,133 | 6/1989 | Vandegrift et al. | 204/1.5 |

*Primary Examiner*—Howard J. Locker
*Attorney, Agent, or Firm*—Wenderoth, Lind & Ponack

[57] ABSTRACT

A method for thermal decomposition treatment of a radioactive waste uses an apparatus comprising a container for holding molten matter of a radioactive waste containing a sodium compound, a pair of electrodes contacting the molten matter, and a power source for applying voltage between the electrodes while changing the polarity thereof every several tens of seconds. In this apparatus, the molten matter can be heated in the container by Joule heat, which is evolved by electric current directly flowed through the molten matter, so that the sodium compound contained in the radioactive waste can be decomposed, vaporized and removed to recover a stabilized radioactive solid as a residue in the container.

5 Claims, 1 Drawing Sheet

METHOD FOR THERMAL DECOMPOSITION TREATMENT OF RADIOACTIVE WASTE

This application is a continuation of now abandoned application, Ser. No. 233,280 filed on Aug. 17, 1988.

BACKGROUND OF THE INVENTION

The present invention relates to a method for thermal decomposition treatment of a radioactive waste generated in a nuclear fuel reprocessing plant and a nuclear power plant, which method can recover a stabilized radioactive solid of reduced volume as a residue by decomposing, vaporizing and removing sodium compounds contained in the radioactive waste.

High-level liquid waste generated from a nuclear fuel reprocessing plant contains sodium compounds, nuclear fission products, actinides, corrosion products, and the like. Such a high-level liquid waste is generally processed by heating it with a heater to evaporate liquid components and to obtain a dried matter, then adding and mixing a glass forming agent and heating and melting the mixture to form a vitrified product.

In order to treat medium- or low-level liquid waste, solidification treatment by the use of a plastic forming agent and a bitumen forming agent has been carried out.

According to the solidification treatment techniques described above, various forming agents which are non-radioactive are added to the original radioactive waste and this results in a serious drawback in that the quantity of the finally processed product increases. There is a limit to the amount of sodium that can be contained in glass in order to form a vitrified product excellent in properties. Therefore, when the high-level liquid waste is subjected to the solidification treatment, it cannot be converted easily to a stable vitrified product. For further stabilization, a greater amount of the glass forming agent must be added, which disadvantageously brings about an increase in the amount of waste.

Moreover, once the solidified product is formed by adding the forming agent, it becomes extremely difficult to extract useful elements contained therein in future and effective utilization of resources cannot be made.

For the reasons described above, a technique for drastically reducing the volume of the radioactive waste and a technique for converting radioactive waste to a stable solid without adding various forming agents has been earnestly sought.

SUMMARY OF THE INVENTION

It is therefore an object of the present invention to provide a method which can convert a molten radioactive waste containing a sodium compound into a stabilized radioactive solid of no sodium content and remarkably reduced volume.

Another object of the present invention is to provide an apparatus used in the method for thermal decomposition treatment of a molten radioactive waste which needs less energy for the treatment, can be made compact and can be operated safely and reliably.

According to the present invention, there is provided an apparatus for thermal decomposition treatment of a radioactive waste, comprising a container for receiving a molten matter of a radioactive waste containing a sodium compound, a pair of electrodes coming into contact with the molten matter, and a power source for applying voltage between the electrodes while changing polarity every several tens of seconds. In such an apparatus, the molten matter can be heated in the container by Joule heat which is evolved by electric current directly flowed through the molten matter so that the sodium compound contained in the radioactive waste can be decomposed, vaporized and removed to recover a stabilized radioactive solid as a residue in the container.

When a radioactive waste containing a sodium compound is heated and melted by heating it with an arbitrary external heater or the like, it becomes possible to directly supply power to the molten matter and to heat the molten matter by Joule heat evolved therein. In other words, the molten matter can be heated efficiently by Joule heat which is evolved within the molten matter by applying a predetermined voltage between the electrodes that are in contact with the molten matter so as to flow a predetermined electric current through the molten matter. By this heating, the sodium compound contained in the molten matter of the waste is decomposed and vaporized and the radioactive solidified product can be recovered as a residue in the container.

By changing the polarity of the voltage applied between the electrode every several tens of seconds, adverse influences due to a gas or the like that adheres to the anode surface and causes an anode fall can be eliminated and thermal decomposition treatment of the molten matter can be carried out continuously and efficiently.

The radioactive residue thus obtained consists primarily of oxides but does not contain a sodium component. Therefore, the residue is under a stable state. This means that the residue can be temporarily stored as it is or can be disposed of as a final processed matter after carrying out another stabilization treatment.

The present invention may be applied to the thermal decomposition of sodium-containing wastes including not only a high-level liquid waste generated from a reprocessing plant for a spent nuclear fuel but also medium- and low-level liquid wastes generated from various nuclear plants.

DETAILED DESCRIPTION OF THE PREFERRED EMBODIMENTS

Figure 1:
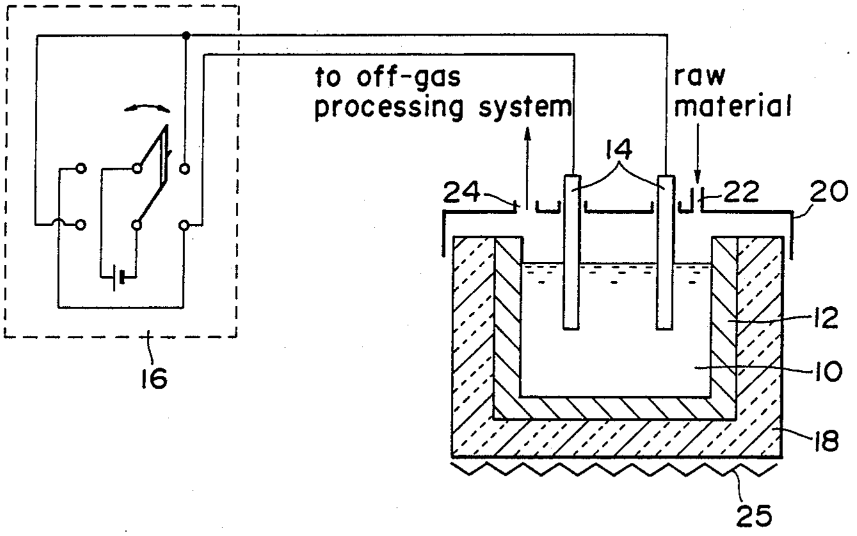
FIG. 1 is a schematic view showing an embodiment of an apparatus for use in a method for thermal decomposition treatment of a radioactive waste in accordance with the present invention.

FIG. 1 illustrates an embodiment of an apparatus for use in thermal decomposition treatment of a radioactive waste according to the present invention. This apparatus includes a container 12 for holding a molten matter 10 of a radioacitve waste containing a sodium compound, a pair of electrodes 14 inserted into the container from above in such a manner as to contact the molten matter 10, and a power source 16 for applying a predetermined voltage between the electrodes 14.

The container 12 for holding the molten matter 10 is made of a metal such as a stainless steel or iron or ceramics such as alumina or silicon carbide, and its periphery and bottom are surrounded by a heat-insulating member 18. A lid 20 is put on the upper part of the container 12. A raw material feed port 22 and an exhaust gas outlet 24 are formed in the lid 20.

The electrodes 14 are made of platinum, silicon carbide, iron, Hastelloy, graphite, or the like, for example, and are disposed inside the container 12 while penetrating the lid 20.

The power source 16 has a performance such that it can apply a voltage of 10 to 30 V between the electrodes 14 while changing the polarity of the electrodes 14 every several tens of seconds (e.g. about every 30 seconds) and can supply an electric current of from 2 to 5 A. Though an operation for changing the voltage polarity is schematically illustrated by a switch in FIG. 1, in practical application the changing operation is controlled automatically.

According to the method of the present invention, a high-level liquid waste containing sodium nitrate and the like, for example, is first heated with a separate heater using a heating source such as microwaves, electricity, steam or the like, and is converted to a dried matter including sodium nitrate, nuclear fission products, actinides, corrosion products, etc. after the liquid component is evaporated. This dried matter is supplied to the raw material feed port 22 into the container 12.

The melting point of the sodium nitrate is 308° C., and it is melted in container 12 by a conventionally well-known, arbitrary external heating system, such as, for example, a resistance heating device 25. Thereafter, the voltage of 10 to 30 V, whose polarity is changed once about every 30 seconds as described above, is applied between the electrodes 14 from the power source 16 to flow the current of 2 to 5 A through the molten matter, so that Joule heat is evolved directly in the molten matter. Thus the sodium compound in the molten matter is decomposed and vaporized, and then discharged to an external off-gas processing system from the exhaust gas outlet 24. Accordingly, a stable radioactive solid remains as a residue inside the container 12.

By changing the polarity of the voltage applied between the electrodes 14 every several tens of seconds by the power source 16 as in the present invention, the influences due to a gas or the like adhering onto the anode surface and causing an anode fall (a phenomenon in which current ceases to flow) can be eliminated and thermal decomposition treatement can be carried out continuously and efficiently. The power source 16 may be a device which generates an alternating current whose polarity changes about twice per minute.

The radioactive residue taken out from the container 12 after the sodium compound is decomposed, vaporized and removed contains no sodium and, since it consists primarily of oxides, is very stable. Thus the residue can be processed in order to separate useful elements contained therein, or can be temporarily stored until such processing is carried out. If required, the residue can be converted to a final disposal matter through another stabilization treatment.

To decompose 1 Kg of sodium nitrate by the use of the apparatus of the present invention, for example, it is only necessary to flow a current of about 1,000 A for about one hour and the processing cost is by far lower than with other conventional processing apparatuses. With the prior art technique, when 1 ton of spent nuclear fuel is reprocessed, 1 to 3 $m^3$ of liquid waste containing about 80 Kg of solid is generated and is mixed with a glass forming agent to form 100 to 130 l of a vitrified product. About 40% of the radioactive solid consists of sodium oxide and the remaining 60% consists of nuclear fission products, actinides, corrosion products, and the like. With the present invention, it is possible to decompose, vaporize and remove the sodium compound, and the final disposal matter is about 50 Kg in weight and about 15 l in volume. Therefore, a remarkable reduction in volume can be accomplished.

Figure 2:
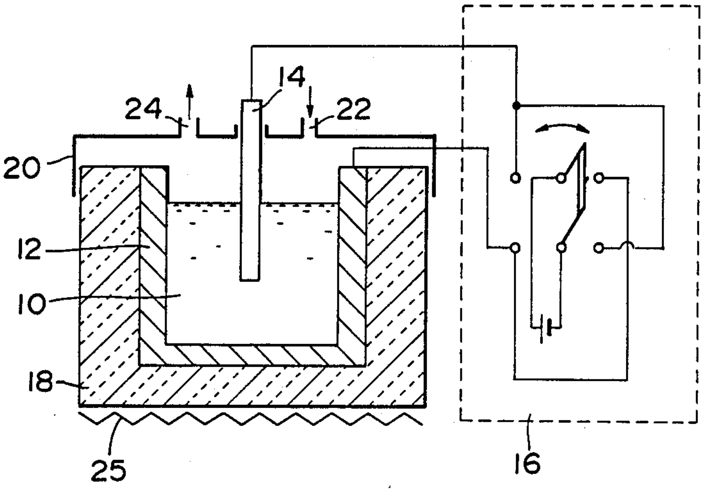
FIG. 2 is an explanatory view showing another embodiment of an apparatus for use in the method for thermal decomposition treatment.

FIG. 2 is an explanatory view showing another embodiment of a thermal decomposition treatment apparatus for use in the method of the present invention. Since the construction of the apparatus is substantially the same as that of the embodiment shown in FIG. 1, like reference numerals are used to identify like components, and their explanation is omitted.

This embodiment differs from the embodiment shown in FIG. 1 in that the container 12 itself is made of an electrode material and is used as one of the electrodes, an electrode 14 is inserted into the center of the molten matter 10 and the power source 16 is connected between electrode 14 and the container 12.

The construction as shown in FIG. 2 also makes it possible to heat, decompose, vaporize and remove the sodium compound in the radioactive waste and to recover the stabilized radioactive solid as the residue in the same manner as in the foregoing embodiment of FIG. 1.

Since the present invention relates to a thermal decomposition treatment method using an apparatus having a container for holding a molten matter of a radioactive waste, electrodes contacting the molten matter and a power source for applying a voltage between the electrodes while changing the polarity every several tens of seconds, as described above, the apparatus can directly heat the molten matter of the radioactive waste by Joule heat evolved therein and can decompose, vaporize and remove the sodium compound contained in the waste. Accordingly, the method of the invention provides the excellent effects that the radioactive solid consisting primarily of stable oxides can be recovered as a residue, and a remarkable reduction in volume and stabilization of the final disposal matter can be accomplished.

Further, the apparatus used in the method of the present invention can decompose and remove the sodium compound with less heating energy, can make the processing apparatus compact, and can carry out continuously and efficiently the thermal decomposition of the sodium compound because the polarity of the applied voltage is changed every several tens of seconds.

The radioactive residue that is obtained by the use of the apparatus of the present invention can be preserved without adding a glass forming agent and the like, so that useful elements contained therein can be easily recovered. Therefore, the present invention is extremely effective for efficiently utilizing available resources.

Although the present invention has been described with reference to the preferred embodiments thereof, many modifications and alterations may be made within the scope of the appended claims.

What is claimed is:

1. A method of thermal decomposition treatment of radioactive liquid waste containing sodium compound, which method comprises the steps of:

heating the radioactive liquid waste to evaporate a liquid component therein and to form a radioactive dried matter containing the sodium compound;

introducing the radioactive dried matter into a container which has a heating device for melting said sodium compound in said radioactive dried matter within said container, a pair of electrodes and a power source for applying voltage between said electrodes;

heating said radioactive dried matter by using said heating device to melt said sodium compound in said radioactive dried matter;

applying electric current to said electrodes while changing the polarity of the voltage every several tens of seconds to directly heat said molten sodium compound by Joule heat, thereby decomposing, vaporizing and removing said sodium compound to form a stabilized radioactive solid as a residue in the container; and taking out said stabilized radioactive solid from said container.

2. The method according to claim 1, wherein said power source changes the polarity of the voltage to be applied once every about 30 seconds.

3. The method according to claim 1, wherein said pair of electrodes comprises two electrodes inserted in said container.

4. The method according to claim 1, wherein one of said pair of electrodes comprises said container made of an electrode material and the other of said pair of electrodes comprises an electrode inserted into the center of said container.

5. The method according to claim 1, wherein said radioactive liquid waste to be treated comprises a high-level liquid waste containing sodium nitrate.

* * * * *